Feb. 13, 1968   R. B. HARVEY   3,368,386
COMBUSTION GAS ANALYZER CONDENSER
Filed April 6, 1964

United States Patent Office 3,368,386
Patented Feb. 13, 1968

3,368,386
COMBUSTION GAS ANALYZER CONDENSER
Robert B. Harvey, Rosemont, Pa., assignor to Mobil
Oil Corporation, a corporation of New York
Filed Apr. 6, 1964, Ser. No. 357,618
7 Claims. (Cl. 73—27)

The present invention relates to a combustion gas analyzer condenser and more particularly combustion gas analyzer having an improved condenser which removes the solid carbon particles in the combustion gases as well as condensing the water out of the combustion gases.

An efficient method of analyzing combustion gases involves the passage of such gases through a sensing device containing a temperature responsive resistance or wire which is caused to change its resistance upon contact by the gas, due to the temperature change caused by the gas. The temperature responsive resistance is connected into a Wheatstone bridge arrangement and the change of resistance is thus measured to provide an indication of the change in temperature which, of course, is dependent on the composition of the gas being analyzed. This method is extremely useful in determining the combustion efficiency and fuel-air ratio of internal combustion engines.

Such measuring devices are also useful to provide analyses of combustion gases from furnaces and the like. The equipment itself is generally relatively simple and of rugged construction. The measurements which are achieved are also quite accurate in that they reflect an indication based on more exacting electrical components, especially the temperature responsive resistance which changes its value in a substantially linear manner. Moreover, such gas analysis apparatus allows continuous testing of the combustion gases, and provides quick responses to any changes occurring in the combustion gases during the test.

However, after constant use the temperature responsive resistance is prone to become contaminated by the exhaust gas being tested which leads to minor inaccuracies and even possible complete breakdown after a time. The contaminants which cause the difficulty are generally water and carbon particles. The water contained in a gas sample has a tendency to collect on the resistance and upon evaporation cause a temperature change detracting from an accurate reading. After long periods of time, the collection of water may short circuit the resistance causing possible damage to the remainder of the electrical indicating portion of the gas analyzer.

Carbon particles, which many times appear in the exhaust gases, also present a problem in that they tend to adhere to the electrical resistance and after a period of time of continuous operation, the coating on the resistance becomes thick enough to decrease the sensitivity of the analyzer. Also, since carbon is an electrical conductor, the possibility of the resistance being eventually shorted out of the circuit is present. Finally, the carbon coating on the resistance, as well as deterioration due to water saturation, requires that the resistance be either cleaned or replaced much more frequently. It is therefore desirable to provide a means to remove carbon particles and water from the combustion gases before they reach the sensing device.

It is also desirable to cool the combustion gases to a relatively low temperature before they reach the sensing device because a larger resistance change will result when such cooled combustion gases pass the temperature responsive resistance. Any carbon deposits that form on the sensing resistance will, accordingly, have only a small effect on the total resistance change. On the other hand, if the combustion gases were relatively warm, the change in resistance due to the variations in the composition of the combustion gases would be small, and this change of resistance could be easily overshadowed by the changes due to the carbon deposits on the resistance resulting in highly inaccurate indications.

In the present invention there is provided a gas analyzer for combustion gases comprising a suction pump to pull combustion gases through condenser and sensing units. The sensing unit utilizes a pair of temperature responsive resistances connected in a Wheatstone bridge circuit, one resistance being placed in the flow path of the combustion gases, the other being exposed atmospheric air so as to compare the thermal capacity of the combustion gases with that of ambient air.

An improved glass condenser is provided comprising a chamber jacketed with water through which the combustion gases are caused to flow. The chamber comprises a vertical pasageway of substantial length and the combustion gases are introduced at the bottom of the chamber and removed at the top thereof. The bottom of the chamber is also immersed in water and the combustion gases are introduced at the water level. The suction pump is adapted to pull the combustion gases through the condenser chamber, and when no combustion gases are being fed into the chamber, the suction pump is of sufficient strength to pull the water level partially over the lower entrance to the chamber through which the combustion gases enter. When the combustion gases are introduced into the chamber, the pressure of these gases forces the water level down to the lower level of this opening or entrance. Thus, solid carbon particles in the combustion gases are collected in the water at the bottom of the chamber, while the condenser itself condenses the water out of the combustion gases as it passes upwards through the chamber, as well as removing any carbon particles not previously removed. Moreover the condenser used in the present invention has the additional advantage of maintaining the combustion gases relatively cool compared to those used in the analyzers of the prior art even when it is in operation for extended periods of time and therefore further reduces the errors due to carbon deposits.

Accordingly, a principal object of the present invention is to provide an improved combustion gas analyzer.

Another object of this invention is the provision of a combustion gas analyzer in which accurate measurements of combustion gases are accomplished.

A further object of this invention is to provide a combustion gas analyzer which utilizes temperature responsive resistances requiring less cleaning and replacement than heretofore has been necessary.

Still another object of this invention is to improve combustion gas analyzers by providing means to remove impurities in the gases being analyzed.

A still further object of this invention is the provision of an improved condenser in a combustion gas analyzer.

Still another object of this invention is to provide means to condense water out of combustion gases being analyzed.

A still further object of this invention is the provision of an arrangement to remove solid carbon particles in the combustion gases being analyzed.

Still another object of this invention is to provide a condenser arrangement which utilizes water in the bottom portion of the condenser to remove carbon particles contained in the combustion gases being analyzed.

A still further object of this invention is the provision of a condenser arrangement to keep combustion gases relatively cool for sustained periods of operation of a combustion gas analyzer.

Further objects and advantages in the present invention will become readily apparent as the following detailed description unfolds and when taken in conjunction with the accompanying drawings, wherein.

Figure 1:
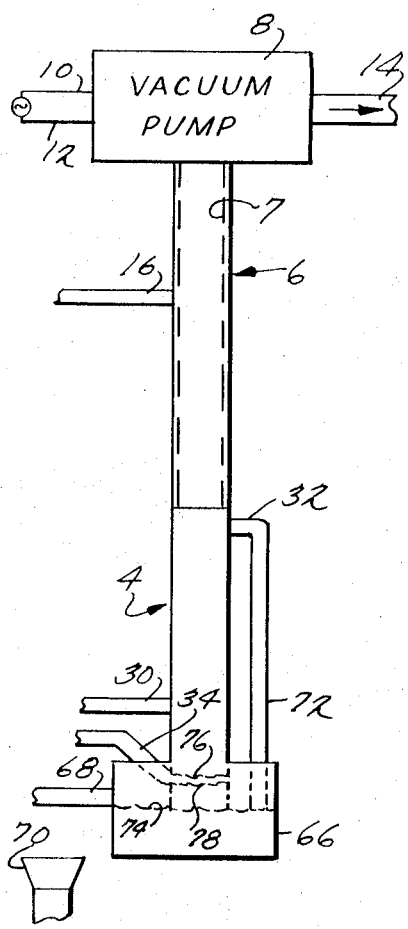
FIG. 1 is a diagrammatic representation of the gas analyzer of the present invention.

Referring now to the drawings, and especially FIG. 1, there is illustrated a combustion gas analyzer comprising a glass condenser 4 and a sensing unit 6. At the top of sensing unit 6 is a suction pump 8 which is utilized to draw combustion gases up through condenser 4 and sensing unit 6. Extending to the left from vacuum pump 8 are a pair of conductors 10 and 12 which can be connected to a suitable source of alternating voltage, such as the normal 110 volt, 60-cycle service, to provide energization for the motor (not shown) of the suction pump. Extending to the right from suction pump 8 is an outlet pipe or connection 14 through which engine exhaust gases or other combustion gases being analyzed are finally passed to the atmosphere.

Sensing unit 6 is located between suction pump 8 and condenser 4 and consists generally of a passageway or chamber 7 through which the gases are caused to flow. A temperature responsive resistance is placed in passageway 7 for direct contact with the combustion gases, while a second temperature responsive resistance is placed adjacent to the first resistance in sensing unit 6 but in a position where it does not come into contact with the combustion gases and where it is exposed to atmospheric air. A cable 16 extends to the left from sensing unit 6 and provides the connection from the resistances to the remainder of the electrical measuring circuit, which will be described in more detail with regard to FIG. 3.

Figure 2:
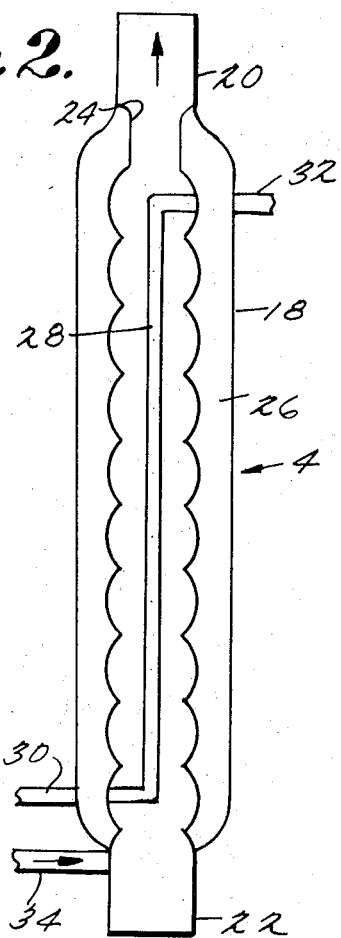
FIG. 2 is a detailed front view of the condenser portion of FIG 1.

Referring now to FIG. 2 of the drawings, there is shown in more detail the improved condenser 4 of the present invention. Condenser 4 consists of an outer tubular shell or casing 18 provided at one end with an adaptor portion 20 which fits snugly into sensing unit 6 providing an air and water-tight fitting. The opposite end 22 of condenser 4 is extended for immersion into water contained in a suitable container. A chamber of passageway 24 extends through the outer shell or casing 18 and forms the actual condenser tube, which is of less diameter than the casing 18. The space between the casing 18 and the wall of the passageway 24 comprises a water jacket 26 around the passageway 24. The passageway 24 repeatedly widens and narrows along its length so as to increase the surface area between the jacket 26 and the passageway 24 and to promote mixing in the passageway 24.

Extending through the major portion of the passageway 24 is a tube 28 of a smaller diameter than the passageway 24 itself. Water jacket 26 is supplied with water through an intake nipple or connection 30 near the bottom of vertical condenser 4, and has an outlet nipple or connection 32 near the top of the condenser for the removal of the water.

A major portion of the water supplied to the intake connection 30 flows through water jacket 26 to the outlet connection 32 thus providing chamber 24 with a water jacket for substantially its entire length. However, a smaller portion of the water supplied at intake nipple 30 is caused to flow through tube 28 upwards to the outlet nipple 32, and in this manner provides a better condensing action on the gases which pass through passageway 24.

The combustion gases are introduced into condenser 4 in the bottom portion of chamber 24 by means of an inlet pipe or conduit 34. It can be seen, therefore, that the combustion gases which are introduced into the gas analyzer at inlet pipe 34, then pass upward through passageway 24 of condenser 4, through passageway 7 of sensing unit 6, past the temperature responsive resistance, and finally are released to the atmosphere through outlet pipe 14 which is connected to suction pump 8.

Figure 3:
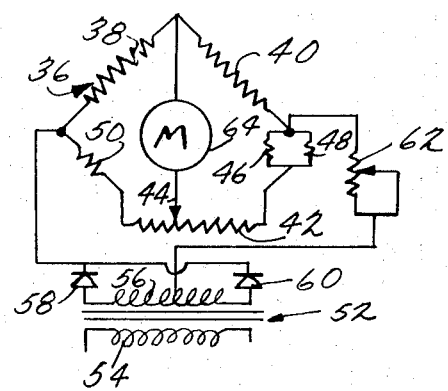
FIG. 3 is a circuit diagram of the electrical measuring portion of the gas analyzer.

In FIG. 3 there is shown a circuit diagram of the measuring portion of the gas analyzer. Indicated by reference numeral 36 is a Wheatstone bridge comprising a pair of temperature responsive resistances 38 and 40 as adjacent legs thereof. The resistance 38 is placed in direct contact with the combustion gases to be analyzed, while the second resistance is placed close to the resistance 38 but not in contact with the gases.

The remainder of Wheatstone bridge 36 comprises a balancing potentiometer 42 with a wiper arm 44 to balance the bridge at its null condition just prior to its being used. A pair of resistances 46 and 48 are connected in parallel between one end terminal of the potentiometer 42 and the resistor 40 to form a third leg of the bridge and a resistance 50 is connected between the other end terminal of the potentiometer 42 and the resistor 38 to form the fourth leg of the bridge.

Power is supplied to the bridge by means of a transformer 52 comprising primary winding 54 and secondary winding 56. Primary winding 54 is connected to a source of alternating voltage (not shown) which can be the same source that provides the energization for the motor of suction pump 8. A pair of diodes 58 and 60 are provided in the secondary of transformer 52 to rectify the alternating voltage and in this manner provide DC voltage to Wheatstone bridge 36. The bridge input voltage is set to its desired value by means of a potentiometer 62.

A meter 64 is connected between the junction of temperature responsive resistances 38 and 40 and wiper arm 44 of potentiometer 42. Meter 64 provides the indication of the resistance changes of temperature responsive resistances 38 and 40 and can be calibrated to provide a reading pertaining to the analysis of the combustion gases under consideration.

The operation of the gas analyzer can best be understood by making reference to FIG. 1. Further included in FIG. 1 is a water container 66 which preferably consists of a standard 600-ml. beaker or the like. A water overflow tube 68 is connected to container 66 for dispensing the overflow water to a drain indicated generally by reference numeral 70. A pipe or hose 72 is connected to outlet nipple 32 which provides a passage for the water leaving condenser 4 to the water container 66.

To begin operation, water is first supplied to condenser 4 by means of intake nipple 30. The water thus supplied fills water jacket 26 and tube 28, and then flows through outlet nipple 32 into water container 66 by means of pipe 72. The container 66 is filled to a level indicated by reference numeral 74, at which time tube 68 allows the water to overflow into drain 70. When the water in container 66 reaches its overflow position, the motor of suction pump 8 is energized thereby creating a pull upward through sensing unit 6 and condenser 4. Suction pump 8 is chosen to be of sufficient strength to pull the water in container 66 up into the lower end 22 of condenser 4 to a level above the lower entrance of exhaust inlet pipe 34. This level is indicated by reference character 76.

When the combustion gases to be analyzed are introduced into the system through inlet pipe 34, the pressure of the combustion gases forces the water level 76 down to the level of the opening of inlet pipe 34, which is indicated by reference numeral 78. Any solid carbon particles appearing in the combustion gases are collected in the water in the container 66. The fact that the water level is positioned at the opening 34 greatly increases the efficiency of the system in removing the carbon particles.

As shown in FIG. 2, the combustion gases after being introduced at inlet pipe 34 are drawn upward through pasageway 24 to the sensing unit. In the travel through chamber 24, the combustion gases are cooled and the moisture and remaining carbon particles in the combustion gases are condensed out by the combined action of water in tube 28 and jacket 26. Therefore, the relatively cool gases passing through adaptor portion 20 and into the sensing unit 6 are relatively dry and free of solid impurities. Moreover the combustion gases will be effectively cooled even after extended periods of operation.

After leaving condenser 4 the combustion gases pass in contact with the temperature responsive resistance 38 and then through the vacuum pump 8 to the outlet 14. The relatively cool combustion gases will have a cooling effect upon the resistance 38. The temperature of the resistance 38 and, therefore, the value of the resistance 38 will change and amount varying in accordance with the thermal capacity of the gases passing over it and the thermal capacity of the combustion gases depends primarily upon the percentage of carbon dioxide in the combustion gases, which in turn correlates with combustion efficiency. Accordingly, the meter 64, which will indicate the change in the value of the resistor 38, will indicate the combustion efficiency of the combustion gases brought in contact with the resistor 38.

The above description is of a preferred embodiment of the invention and many modifications may be made thereto without departing from the spirit and scope of the invention, which is defined in the appended claims.

What is claimed is:

1. A combustion gas analyzer comprising elongated condensing means defining a vertically disposed chamber, said chamber having an opening at the bottom, an inlet near the bottom for introducing combustion gases to said chamber and an outlet at the top for removing combustion gases from said chamber, sensing means having a passageway therethrough connected to the outlet of the condensing means and being operable to detect the thermal capacity of the gases passing through said passageway, a water container surrounding the opening at the bottom of said chamber adapted to immerse said opening in water, and pump means adapted to pull the gases through said condensing means and said sensing means.

2. The invention as defined in claim 1 wherein said elongated condensing means defining said chamber includes a water jacket surrounding said chamber and has an interior wall so dimensioned as to provide a repeated widening and narrowing of said chamber to increase the surface areas of said chamber and to promote mixing of said gases in said chamber.

3. The invention as defined in claim 2 further comprising tube means for containing a flow of water extending through the center of said chamber for substantially the entire length thereof to provide increased condensing action of said condensing means.

4. In the analysis of combustion gases of variable composition, the steps of introducing the gases into a condenser passage at substantially the level of a quantity of water within said passage, maintaining the level of said water at the height which the gases are introduced within said passage, drawing said gases through said passage, and detecting the thermal capacity of said gases after said gases pass through said condenser.

5. In the analysis of combustion gases of variable composition, the steps of introducing the gases into a condenser passage at substantially the level of a quantity of water within said passage, maintaining the level of said water at the height which the gases are introduced within said passage, drawing said gases through said passage, and providing a visual indication of the thermal capacity of said gases after they pass through said condenser.

6. A combustion gas analyzer comprising condenser means defining a gas flow passage, means for providing a quantity of water in said gas flow passage, means to introduce combustion gases into said passage, said condenser means including means for removing the moisture and carbon particles contained in said gases, means connected to said passage for detecting the thermal capacity of gases passing therethrough, and means for drawing said combustion gases through said passage and then through said detecting means, said drawing means maintaining the level of said water at the point at which said combustion gases are introduced into said chamber.

7. In a combustion gas analyzer of the type including a suction pump, sensing unit, and condenser, the improvement wherein said condenser definies a vertically disposed elongated chamber, an inlet pipe adapted to communicate with a source of combustion gas to be analyzed and entering said chamber near the bottom thereof, a water jacket surrounding said chamber, a tube extending through the center of said chamber for substantially the entire length of said chamber, means to cause water to flow through said water jacket and tube, and means for maintaining water in the lower portion of said chamber at a level at least as high as said inlet pipe.

References Cited
UNITED STATES PATENTS

| | | | |
|---|---|---|---|
| 1,934,075 | 11/1933 | Lewis | 73—23 XR |
| 2,005,036 | 6/1935 | Howe | 73—27 XR |
| 2,719,425 | 10/1955 | Kalle | 73—23 |
| 3,097,518 | 7/1963 | Taylor et al. | 73—27 XR |

OTHER REFERENCES

Walker et al.: The Review of Scientific Instruments, vol. 28, No. 10, October 1957, pp. 789–792.

RICHARD C. QUEISSER, *Primary Examiner.*

L. R. FRANKLIN, C. I. McCLELLAND,
*Assistant Examiners.*